United States Patent
Miyakawa et al.

(10) Patent No.: US 9,961,525 B2
(45) Date of Patent: May 1, 2018

(54) COMMUNICATION SYSTEM

(71) Applicant: SoftBank Corp., Tokyo (JP)

(72) Inventors: Junichi Miyakawa, Overland Park, KS (US); Teruaki Suzuki, Tokyo (JP); Hoshito Ueyama, Tokyo (JP); Takayuki Nihei, Kanagawa (JP); Kenji Yokota, Tokyo (JP); Riri Nomoto, Tokyo (JP); Tomomi Nakagawa, Kanagawa (JP)

(73) Assignee: SoftBank Corp., Tokyo (JP)

( * ) Notice: Subject to any disclaimer, the term of this patent is extended or adjusted under 35 U.S.C. 154(b) by 139 days.

(21) Appl. No.: 14/829,601

(22) Filed: Aug. 18, 2015

(65) Prior Publication Data
US 2015/0358799 A1 Dec. 10, 2015

Related U.S. Application Data

(63) Continuation of application No. PCT/JP2013/000918, filed on Feb. 19, 2013.

(51) Int. Cl.
*H04M 11/04* (2006.01)
*H04W 4/22* (2009.01)
(Continued)

(52) U.S. Cl.
CPC .......... *H04W 4/22* (2013.01); *H04B 7/15507* (2013.01); *H04L 47/24* (2013.01);
(Continued)

(58) Field of Classification Search
None
See application file for complete search history.

(56) References Cited

U.S. PATENT DOCUMENTS 7,702,352 B2 * 4/2010 Conner ............. H04W 52/0296
370/338
7,961,212 B2 * 6/2011 Woodworth .......... H04L 12/587
348/14.01
(Continued)

FOREIGN PATENT DOCUMENTS

JP 2003-229954 A 8/2003
JP 2006-319555 A 11/2006
(Continued)

OTHER PUBLICATIONS

International Preliminary Report on Patentability for International Application No. PCT/JP2013/000918, issued by the International Bureau of WIPO dated Sep. 3, 2015.
(Continued)

*Primary Examiner* — Shantell L Heiber

(57) ABSTRACT

Communication becomes impossible for many mobile stations when a communication failure occurs in a fixed station while the mobile stations are operating in an infrastructure mode. Provided is a communication system that includes a plurality of mobile stations and at least one of a base station and a wireless LAN access point, wherein the plurality of mobile stations establish communication with each other and form an ad hoc network that realizes a mesh network topology, and at least one mobile station among the plurality of mobile stations establishes communication with at least one of the base station and the wireless LAN access point, and connects another mobile station among the plurality of mobile stations to the at least one of the base station and the wireless LAN access point using a tethering function.

19 Claims, 5 Drawing Sheets

(51) Int. Cl.
- *H04W 76/02* (2009.01)
- *H04L 12/851* (2013.01)
- *H04W 4/24* (2018.01)
- *H04B 7/155* (2006.01)
- *H04W 84/22* (2009.01)
- *H04W 88/04* (2009.01)
- *H04W 76/00* (2018.01)
- *H04W 84/18* (2009.01)

(52) U.S. Cl.
CPC ........... *H04W 4/24* (2013.01); *H04W 76/023* (2013.01); *H04W 84/22* (2013.01); *H04W 88/04* (2013.01); *H04W 76/007* (2013.01); *H04W 84/18* (2013.01)

(56) References Cited

U.S. PATENT DOCUMENTS

| | | | | |
|---|---|---|---|---|
| 8,275,672 | B1* | 9/2012 | Nguyen | G06Q 30/0635 705/26.1 |
| 8,339,990 | B1* | 12/2012 | Tzamaloukas | H04W 48/18 370/254 |
| 9,179,475 | B2* | 11/2015 | Koleszar | H04L 45/32 |
| 2004/0177377 | A1* | 9/2004 | Lin | H04L 29/06027 725/81 |
| 2005/0058108 | A1* | 3/2005 | Ekberg | H04L 67/16 370/338 |
| 2007/0025367 | A1* | 2/2007 | Wijnands | G06F 1/1632 370/401 |
| 2013/0229910 | A1* | 9/2013 | McKnight, Jr. | H04W 24/04 370/218 |
| 2014/0051379 | A1* | 2/2014 | Ganesh | H04M 1/72538 455/404.1 |

FOREIGN PATENT DOCUMENTS

| | | |
|---|---|---|
| JP | 2013-021738 A | 1/2013 |
| WO | 2008/035424 A1 | 3/2008 |

OTHER PUBLICATIONS

International Search Report for International Application No. PCT/JP2013/000918, issued by the Japan Patent Office dated Mar. 19, 2013.

Office Action issued for counterpart Japanese Application 2013-153651, issued by the Japan Patent Office dated Feb. 4, 2014.

* cited by examiner

COMMUNICATION SYSTEM

The contents of the following PCT patent application are incorporated herein by reference: NO. PCT/JP2013/000918 filed on Feb. 19, 2013.

BACKGROUND

1. Technical Field

The present invention relates to a communication system.

2. Related Art

When a mobile station such as a mobile telephone sends and receives data to and from a fixed station such as a wireless access point, the mobile device operates in an infrastructure mode. On the other hand, research is progressing for ad hoc networks in which a plurality of mobile stations perform wireless communication with each other in a peer to peer manner, as shown in Patent Document 1, for example.

PRIOR ART DOCUMENTS

Patent Documents

Patent Document 1: Japanese Patent Application Publication No. 2013-021738

When a mobile station operates in the infrastructure mode, communication becomes impossible for most mobile stations when a communication failure occurs in the fixed station. Furthermore, when there is a mobile station in an area where the radio wave strength from the fixed station is insufficient, the mobile station cannot perform communication. On the other hand, when long distance communication is realized while in the ad hoc mode, there is a large amount of power consumption.

SUMMARY

According to a first aspect of the present invention, provided is a communication system that includes a plurality of mobile stations and at least one of a base station and a wireless LAN access point, wherein the plurality of mobile stations establish communication with each other and form an ad hoc network that realizes a mesh network topology, and at least one mobile station among the plurality of mobile stations establishes communication with at least one of the base station and the wireless LAN access point, and connects another mobile station among the plurality of mobile stations to the at least one of the base station and the wireless LAN access point using a tethering function.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
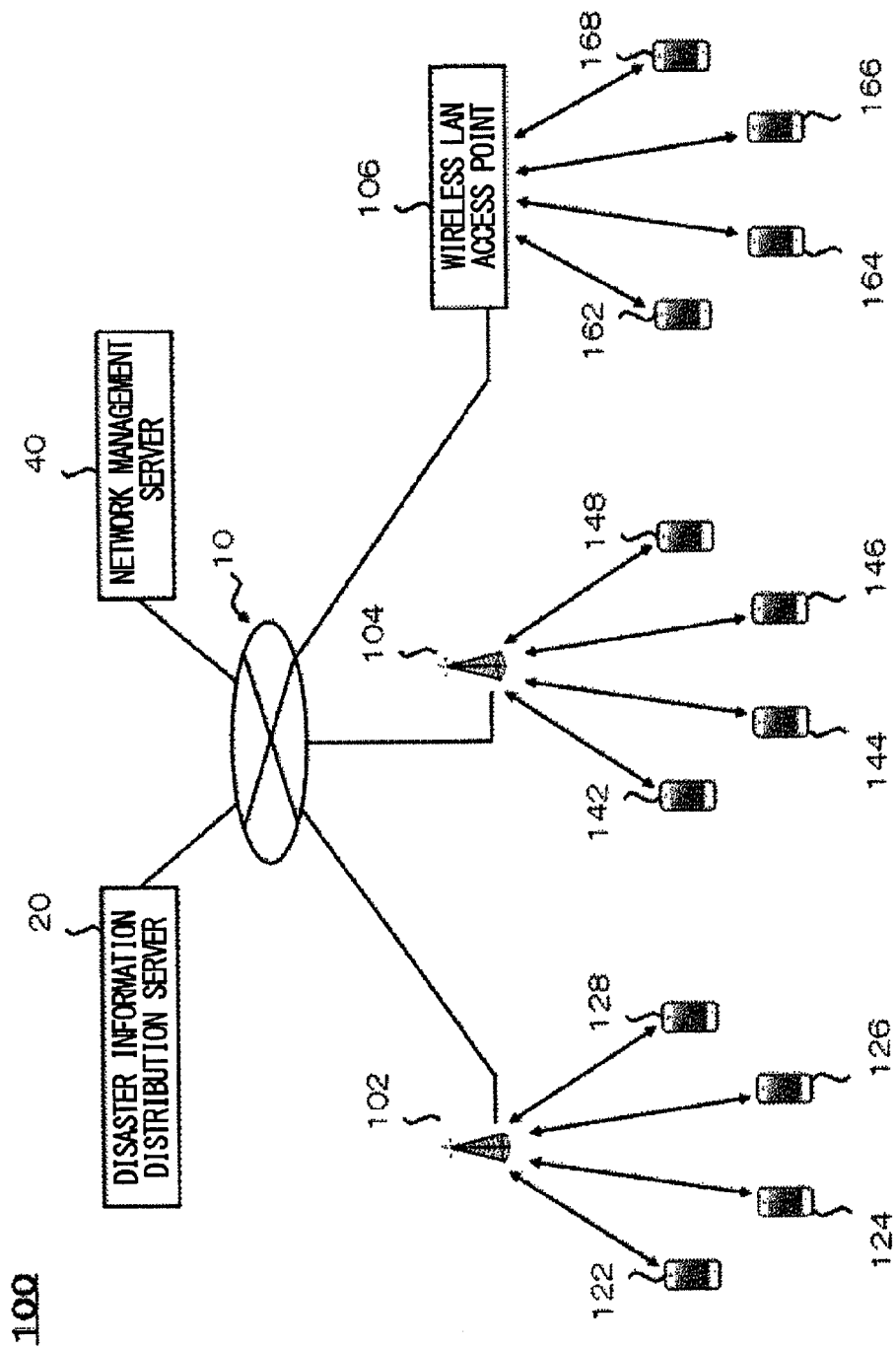
FIG. 1 is a schematic view of an exemplary communication system 100 according to the present embodiment during normal operation.
Figure 2:
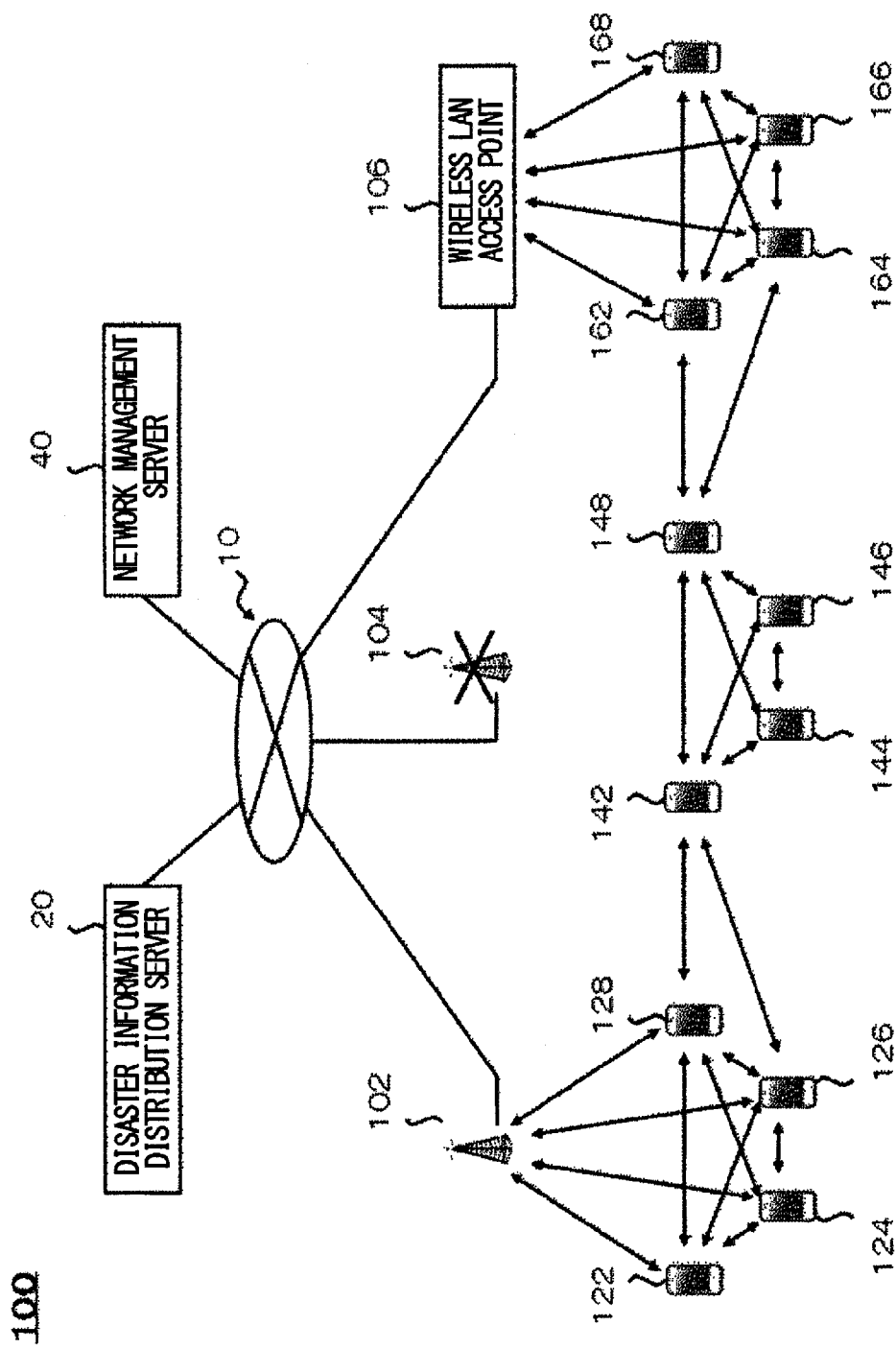
FIG. 2 is a schematic view of an exemplary communication system 100 according to the present embodiment when a communication failure occurs.

The following describes an embodiment of a communication system 100, using FIGS. 1 and 2. FIG. 1 is a schematic view of an exemplary configuration and operation of the communication system 100 according to the present embodiment during normal operation. FIG. 2 is a schematic view of an exemplary configuration and operation of the communication system 100 according to the present embodiment when a communication failure occurs. FIG. 2 describes the communication system 100 according to the present embodiment using an example in which a communication failure occurs in a base station 104 as a result of the base station 104 being damaged by a natural disaster.

The present embodiment describes an example in which a mobile terminal of the communication system 100 switches the operational mode from an infrastructure mode to an ad hoc mode, using the reception of emergency disaster information as a trigger. However, the communication system 100 is not limited to the present embodiment. For example, the mobile terminal of the communication system 100 may switch the operational mode using the inability to send and receive data as a trigger, such as when the mobile terminal is outside the service area of a communication network. Furthermore, the operational mode switching may be performed using the reception of instructions or input of information indicating switching of the operation mode from a user as the trigger.

In the present embodiment, the communication system 100 includes a base station 102, a base station 104, a wireless LAN access point 106, and a plurality of mobile terminals including mobile terminals 122 to 128, mobile terminals 142 to 148, and mobile terminals 162 to 168. The plurality of mobile terminals is an example of a plurality of mobile stations. The mobile terminals may have a wireless LAN function, and include smart phones, mobile phones, tablet terminals, wireless M2M receivers, and the like.

In the present embodiment, there are cases where the base station 102, the base station 104, and the wireless LAN access point 106 are operating normally (referred to as normal operation), and there are cases where the communication system 100 experiences a communication failure during which at least one of the base station 102, the base station 104, and the wireless LAN access point 106 experiences a communication failure due to damage or problems in the communication equipment or loss of power and cannot operate normally (referred to as communication failure occurrence, and a time when a communication failure occurs is an example of a time when an emergency occurs), and at least some of the mobile terminals switch their operational mode between these according to these cases. In this way, even when there is a communication failure in the fixed station, large-scale communication problems are prevented from occurring.

The communication system 100 may send and receive data to and from a disaster information distribution server 20 and a network management server 40, via the communication network 10. The communication network 10 may be a wired communication path, a wireless communication path, or a combination of both. The communication network 10 may be the Internet, a dedicated line, a wireless packet communication network, or a combination thereof.

The communication used by the communication system 100 is not particularly limited, and may be 3G, WiFi®, AXGP (Advanced eXtended Global Platform), TD-LTE (Time Division Long Term Evolution), FDD-LTE (Frequency Division Duplex Long Term Evolution), satellite communication, Bluetooth®, Zigbee® or optical wireless transmission. At the current time, the communication method is not limited, and a future communication method may be used, such as LTE Advanced.

The disaster information distribution server 20 distributes emergency disaster information that is provided by an office of the state, a governing body, or the like. For example, the disaster information distribution server 20 distributes emergency earthquake information that is provided by the Meteorological Agency.

The network management server 40 controls or manages the communication of the base station 102 and the base station 104. In the present embodiment, the network management server 40 may be a portion of the communication system 100.

The network management server 40 may perform a process to give preferential treatment to a prescribed mobile terminal from among the plurality of mobile terminals. The prescribed mobile terminal is a mobile terminal that operates in the ad hoc mode and sends and receives data via a prescribed base station, for example. The prescribed base station may be a base station that is in an area where a prescribed event occurs, and is a base station that is in the vicinity of a base station that experiences a communication failure or the vicinity of a base station that is expected to experience a communication failure.

The process of providing preferential treatment to the prescribed mobile terminal may be a process to exclude the data being sent and received via the prescribed base station from the total data amount transmitted by the mobile terminal while the mobile terminal is operating in the ad hoc mode. In this way, even when a communication limit (referred to as a bandwidth limit) is placed on a user who is sending or receiving an amount of data that is greater than a prescribed data amount, the user of the mobile terminal operating in the ad hoc mode does not suffer any inconvenience.

The process of giving preferential treatment to the prescribed mobile terminal may be a process to preferentially relay the sending and receiving of data between the base station and a mobile terminal operating in the ad hoc mode to a greater degree than the sending and receiving of data between the base station and a mobile terminal not operating in the ad hoc mode. Furthermore, the process of giving preferential treatment may be a process to provide the user of the mobile terminal with a financial benefit, e.g. a discount on data communication costs.

The network management server 40 may provide information relating to the preferential treatment process to the mobile terminal that is the target of the preferential treatment. For example, the network management server 40 provides information indicating that a mobile terminal is the target of the preferential treatment as a result of the mobile terminal operating in the ad hoc mode or moving into an area where the mobile terminal can communicate with the prescribed base station.

The disaster information distribution server 20 and the network management server 40 are each an information processing apparatus having a general configuration that includes a data processing apparatus including a CPU, a ROM, a RAM, a communication interface, and the like, an input apparatus such as a keyboard, touch panel, or a microphone, an output apparatus such as a display apparatus or speakers, and a storage apparatus such as a memory or HDD, and the disaster information distribution server 20 and the network management server 40 may be realized by software that defines the operation of each component thereof. The disaster information distribution server 20 and the network management server 40 may each be a virtual server or cloud system. The functions of the disaster information distribution server 20 and the network management server 40 may be realized by a plurality of servers.

The base station 102, the base station 104, and the wireless LAN access point 106 may each relay data transmitted from each of the mobile terminals. The base station 102, the base station 104, and the wireless LAN access point 106 relay the data transmitted to each of the mobile terminals.

The mobile terminals 122 to 128, the mobile terminals 142 to 148, and the mobile terminals 162 to 168 may be terminals that can send and receive data to and from at least one of the base station 102, the base station 104, and the wireless LAN access point 106, and may be mobile phones, wireless terminals, or mobile terminals, such as a PDA, tablet, notebook computer, or laptop computer. The mobile terminals 122 to 128, the mobile terminals 142 to 148, and the mobile terminals 162 to 168 each include a data processing apparatus including a CPU, a ROM, a RAM, a communication interface, and the like, an input apparatus such as a keyboard, a touch panel, a microphone, a GPS information acquiring apparatus, an acceleration sensor, or a gyro sensor, an output apparatus such as a display apparatus or speakers, and a storage apparatus such as a memory or HDD, and each mobile terminal may be realized by activating software to realize a tethering function or the ad hoc mode. This software may be installed in the mobile terminal when the mobile terminal is shipped or installed in the mobile terminal after a user has purchased the mobile terminal. This software may be downloaded to the mobile terminal from a website. This software may be executed in the background by the mobile terminal.

As shown in FIG. 1, the mobile terminal 122, the mobile terminal 124, the mobile terminal 126, and the mobile terminal 128 each send and receive data to and from the base station 102 in the infrastructure mode during normal operation. In the same manner, the mobile terminal 142, the mobile terminal 144, the mobile terminal 146, and the mobile terminal 148 each send and receive data to and from the base station 104 in the infrastructure mode during normal operation. Furthermore, the mobile terminal 162, the mobile terminal 164, the mobile terminal 166, and the mobile terminal 168 each send and receive data to and from the wireless LAN access point 106 in the infrastructure mode during normal operation.

On the other hand, as shown in FIG. 2, when a communication failure occurs in the base station 104, the mobile terminals 122 to 128, the mobile terminals 142 to 148, and the mobile terminals 162 to 168 each send and receive data in the ad hoc mode. In this way, communication is established between the mobile terminals, and an ad hoc network is formed that realizes a mesh network topology. In the ad hoc network realizing the mesh network topology, some of the mobile terminals that serve as point-to-point connections are unable to form the mesh depending on the distance relationship among the mobile terminals 142 to 148, for example.

The mobile terminals 122 to 128 each establish communication with the base station 102. Furthermore, the mobile terminals 122 to 128 each serve as an access point by having a tethering function in the infrastructure mode, for example, and connect other mobile terminals (e.g. the mobile terminals 142 to 148) to the base station 102. The mobile terminals 162 to 168 each establish communication with the wireless LAN access point 106 in the infrastructure mode. Furthermore, the mobile terminals 162 to 168 each serve as an access point by having a tethering function in the infrastructure mode, for example, and connect other mobile terminals realizing the mesh network topology (e.g. the mobile terminals 142 to 148) to the wireless LAN access point 106. In this way, with the present embodiment, the mobile terminals 142 to 148 form an ad hoc network realizing a mesh network topology between the mobile terminals 122 to 128 having the tethering function in the infrastructure mode and the mobile terminals 162 to 168 having a tethering function. As a result, it is possible to shorten the distance that communication is relayed by the network, and therefore the power consumption of the mobile terminals can be restricted.

In a case where the mobile terminals each send and receive data in the infrastructure mode, a star network is formed with mobile terminals (e.g. mobile terminals 122 to 128) that have a tethering function and are capable of connecting other mobile terminals (e.g. mobile terminals 142 to 148) to the communication network 10 as the center. In contrast to this, with the present embodiment, the mobile terminals each send and receive data in the ad hoc mode. Therefore, it is possible to form the mesh network that includes mobile terminals that have the tethering function and are capable of connecting other mobile terminals to the communication network 10. In this way, data can be sent and received even by mobile terminals that are in an area that is not reached by radio waves from a base station or wireless LAN access point.

When communication can be established without at least one of the base station 102 and the wireless LAN access point 106, each mobile terminal may prioritize transmission of data received from another mobile terminal via the ad hoc network to the base station 102 or the wireless LAN access point 106 with which communication has been established over transmission of this data to yet another mobile terminal. In this way, it is possible to restrict unnecessary routing.

In the present embodiment, each mobile terminal switches the operational mode from the infrastructure mode to the ad hoc mode when emergency disaster information is received from the disaster information distribution server 20. For example, a mobile terminal switches the operational mode from the infrastructure mode to the ad hoc mode by executing an application program for performing a function of ad hoc communication.

The application program for performing a function of ad hoc communication may limit the processes that can be executed by the mobile terminal according to predetermined rules, when the mobile terminal is operating in the ad hoc mode. For example, the execution of programs that require a large amount of communication or consume a large amount of power are restricted. As another example, the download of files having a large data amount may be restricted. Furthermore, the sending and receiving of electronic mail with an image, audio, or video file attached thereto may be restricted, or this image, audio, or video file may be deleted when such a file is attached to an electronic mail.

Each mobile terminal may execute the application program for performing a function of ad hoc communication when the mobile terminal is being charged or when the remaining amount of charge is greater than a prescribed amount. In this way, it is possible to prevent the remaining charge of the mobile terminal from being depleted when the user of the mobile terminal is using their own mobile terminal.

As described above, the present embodiment shows an example of the communication system 100 in which each mobile terminal switches the operational mode from the infrastructure mode to the ad hoc mode, with the reception of emergency disaster information as a trigger. However, the trigger for the mobile terminal to switch the operational mode from the infrastructure mode to the ad hoc mode is not limited to the present embodiment.

According to another embodiment, a portion of the mobile terminals may switch the operational mode from the infrastructure mode to the ad hoc mode when it is impossible to establish a connection to the base station 102, the base station 104, or the wireless LAN access point 106 for a predetermined time. Furthermore, the switching of the operational mode from the infrastructure mode to the ad hoc mode may be performed with at least some of the mobile terminals receiving input or instructions from the user of the mobile terminal as a trigger. In these cases, the processes that can be executed by the mobile terminal are not limited by the predetermined rules according to the application program for realizing the ad hoc communication function. Each mobile terminal may execute the application program for realizing the ad hoc communication function when the mobile terminal is being charged or when the remaining charge amount is greater than a predetermined amount.

All of the mobile terminals forming the communication system 100 may perform the operational mode switching based on the same trigger, or some of the mobile terminals may perform the operational mode switching based on a trigger that is different from the trigger of other mobile terminals. For example, when emergency disaster information is distributed, each of the mobile terminals 122 to 128 and 162 to 168 switches the operational mode with the reception of the emergency disaster information as a trigger. On the other hand, each of the mobile terminals 142 to 148 cannot receive the emergency disaster information because the base station 104 is damaged before the emergency disaster information can be distributed thereto from the base station 104. However, each of the mobile terminals 142 to 148 switches the operational mode with the inability to establish a connection to at least one of the base station 102, the base station 104, and the wireless LAN access point 106 for a prescribed time as a trigger. In this way, each of the mobile terminals 142 to 148 can send and receive data such as the emergency disaster information via one of the mobile terminals 122 to 128 and 162 to 168.

Figure 3:
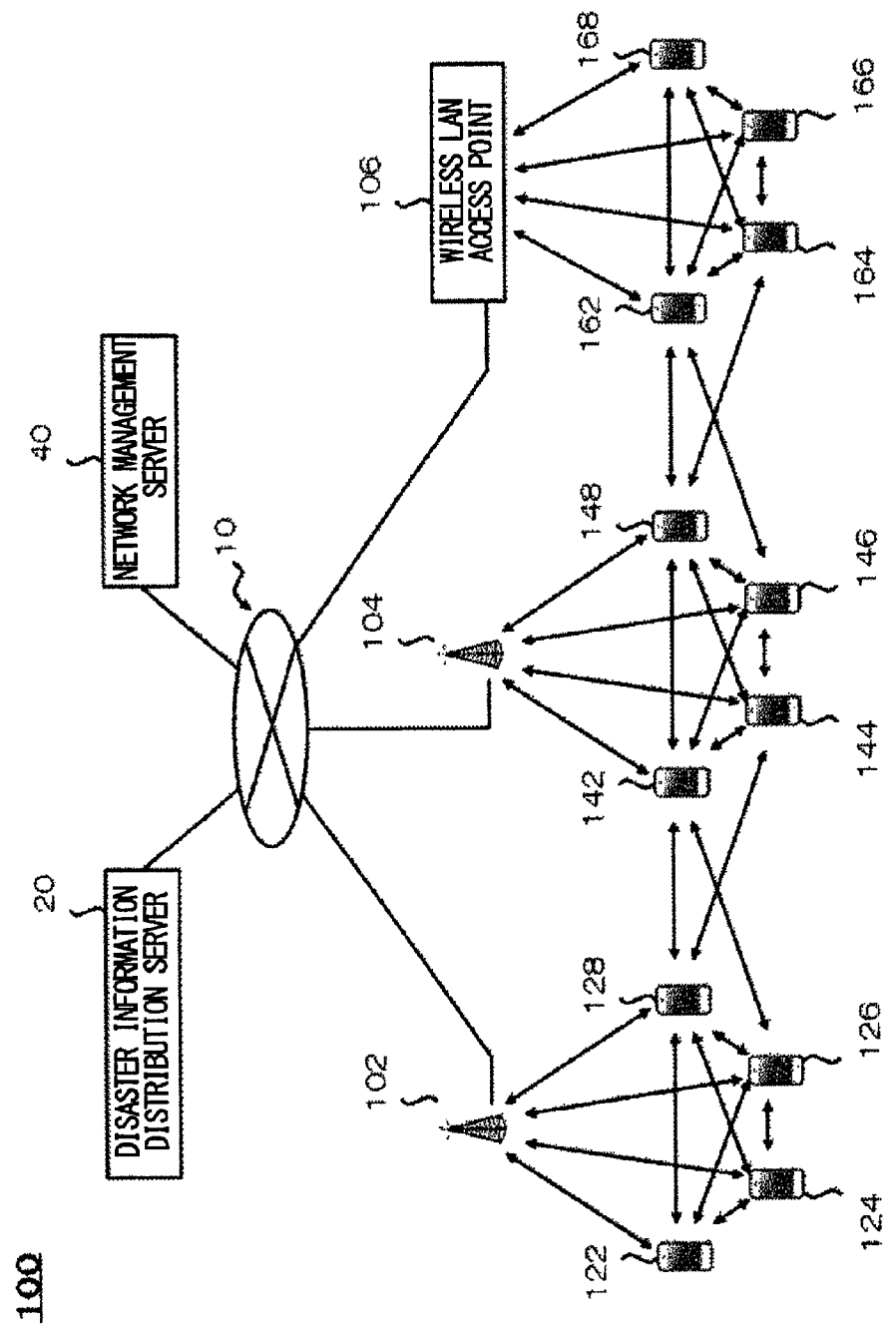
FIG. 3 is a schematic view of an exemplary communication system 100 according to the present embodiment during normal operation.
Figure 4:
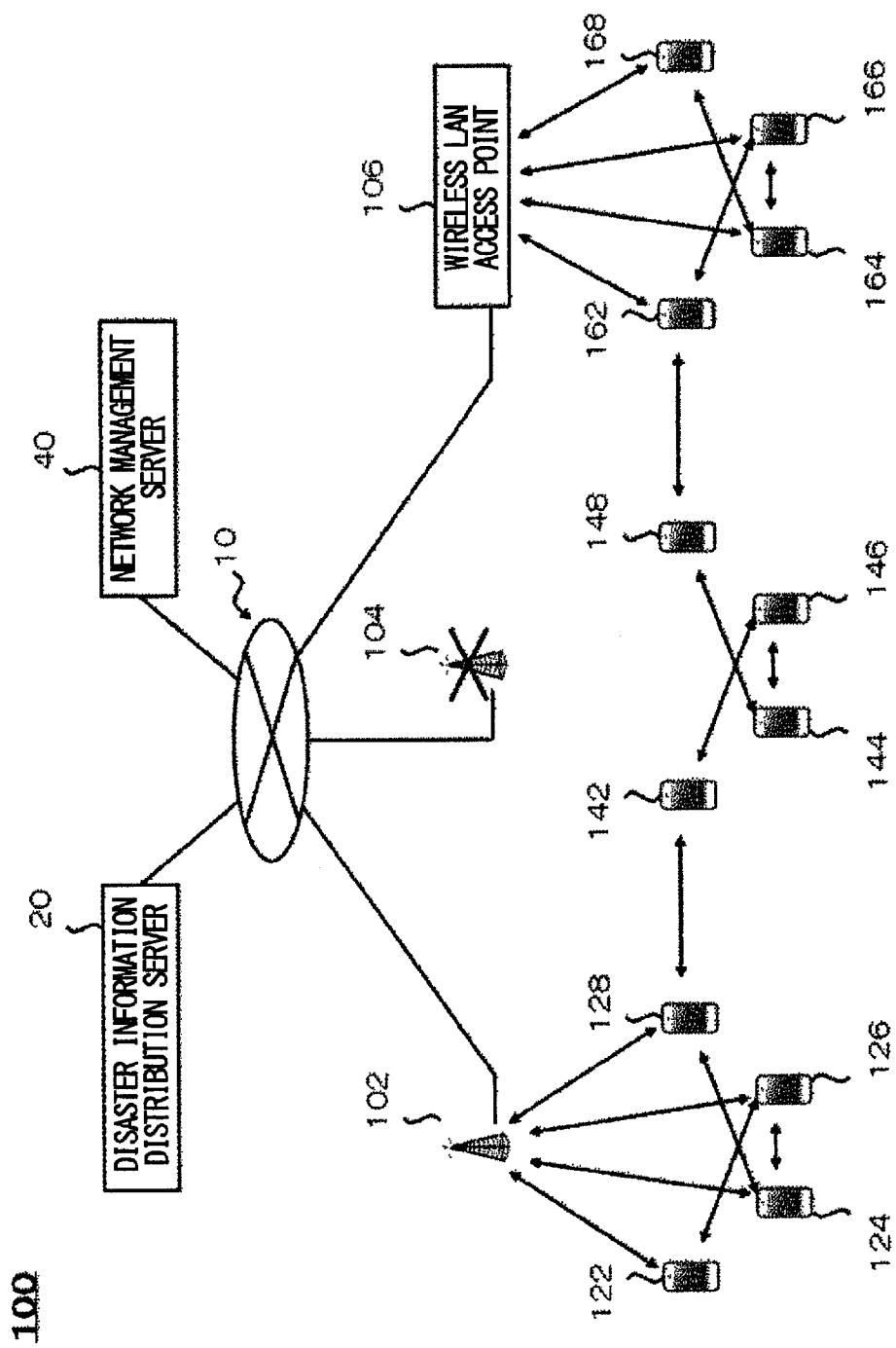
FIG. 4 is a schematic view of an exemplary communication system 100 according to the present embodiment during emergency operation.

The following describes another embodiment of the communication system 100, using FIGS. 3 and 4. FIG. 3 is a schematic view of an exemplary configuration and operation of the communication system 100 according to the present embodiment during normal operation. FIG. 4 is a schematic view of an exemplary configuration and operation of the communication system 100 according to the present embodiment during an emergency. FIG. 4 describes the communication system 100 according to the present embodiment using an example in which a communication failure occurs in a base station 104 as a result of the base station 104 being damaged by a natural disaster.

The communication system 100 according to the present embodiment differs from the communication system 100 described using FIGS. 1 and 2 in that each mobile terminal communicates with the other mobile terminals in the ad hoc mode and operates in the infrastructure mode with the base station 102, the base station 104, and the wireless LAN access point 106. The communication system 100 according to the present embodiment differs from the communication system 100 described using FIGS. 1 and 2 in that an upper limit or maximum value for the number of links during an emergency is set to be less than an upper limit or maximum value for the number of links during normal operation. In other words, the communication system 100 according to the present embodiment has a first ad hoc mode (referred to as the normal operation ad hoc mode) in which a first threshold value is set for the number of links and a second ad hoc mode (referred to as the emergency ad hoc mode) in which a second threshold value that is less than the first threshold value is set for the number of links.

The communication system 100 according to the present embodiment may have the same configuration as the communication system 100 described using FIGS. 1 and 2, aside from the differences described above. In the communication system 100 according to the present embodiment, the description of components and functions that are the same as those of the communication system 100 described using FIGS. 1 and 2 are omitted. The communication system 100 described using FIGS. 1 and 2 may have the same configuration as the communication system 100 according to the present embodiment, as long as this does not result in a technical contradiction.

As shown in FIG. 3, the mobile terminal 122, the mobile terminal 124, the mobile terminal 126, and the mobile terminal 128 each send and receive data to and from the base station 102 in the infrastructure mode during normal operation. On the other hand, the mobile terminals 122, 124, 126, and 128 send and receive data to and from the other mobile terminals in the ad hoc mode. In the same manner, the mobile terminal 142, the mobile terminal 144, the mobile terminal 146, and the mobile terminal 148 each send and receive data to and from the base station 104 in the infrastructure mode during normal operation. The mobile terminals 142, 144, 146, and 148 send and receive data to and from the other mobile terminals in the ad hoc mode. Furthermore, the mobile terminal 162, the mobile terminal 164, the mobile terminal 166, and the mobile terminal 168 each send and receive data to and from the wireless LAN access point 106 in the infrastructure mode during normal operation. On the other hand, the mobile terminals 162, 164, 166, and 168 send and receive data to and from the other mobile terminals in the ad hoc mode.

In this way, even when some mobile terminals among the plurality of mobile terminals are in an area where it is difficult for radio waves to reach from the base station 102, the base station 104, or the wireless LAN access point 106, it is possible to establish communication between the mobile terminal in this area and at least one of the base station 102, the base station 104, and the wireless LAN access point 106 via an ad hoc network formed by two or more mobile terminals. The area that is difficult for radio waves to reach can be exemplified by an indoor area, an underground area, or a mountaintop.

In the same manner as in the communication system 100 described using FIGS. 1 and 2, the network management server 40 may perform a process to give preferential treatment to a prescribed mobile terminal among the plurality of mobile terminals. In the present embodiment, the prescribed mobile terminal can be exemplified by a mobile terminal that is in a region that is difficult to reach for the radio waves from the base station or the wireless LAN access point, such as an indoor area, an underground area, or a mountaintop.

When each of the mobile terminals is operating in the ad hoc mode during normal operation (referred to as the normal operation ad hoc mode), the upper limit of the number of links may be set, but an upper limit of the number of links need not be set. By setting the upper limit of the number of links, the routing process becomes easier. Furthermore, data can be sent and received between mobile terminals that are relatively close to each other, and therefore the power consumption can be restricted. When an upper limit is set for the number of links, this upper limit is an example of a first threshold value.

On the other hand, as shown in FIG. 4, when a communication failure occurs in the base station 104, each of the mobile terminals sets an upper limit for the number of links that is less than the upper limit during normal operation. When operating in the normal operation ad hoc mode, each mobile terminal may switch the operational mode to the emergency ad hoc mode upon receiving the emergency disaster information. By decreasing the upper limit for the number of links to be less than the number of links during normal operation when an emergency occurs, e.g. when communication failure occurs, it is possible to restrict the power consumption of each mobile terminal. The upper limit for the number of links of each mobile terminal in the emergency ad hoc mode may be set according to the remaining charge of each mobile terminal.

Figure 5:
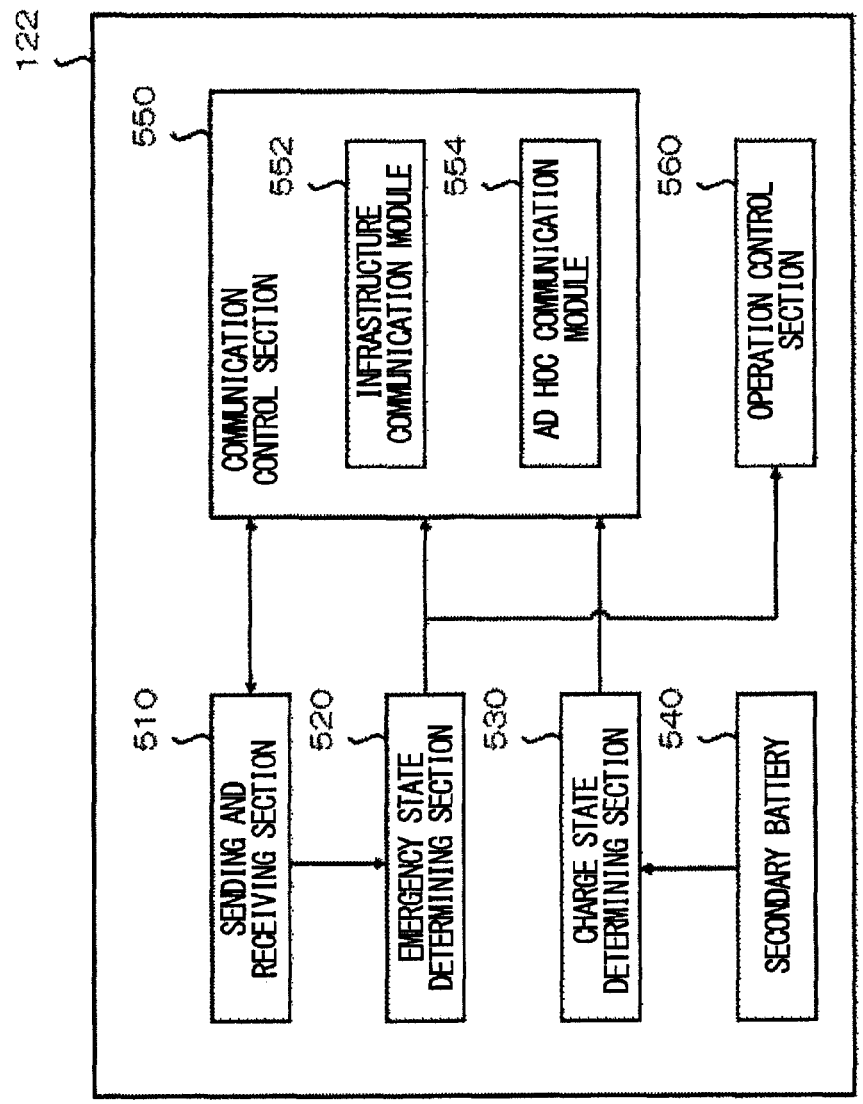
FIG. 5 is a schematic view of an exemplary internal configuration of the mobile terminal 122.

FIG. 5 is a schematic view of the internal configuration of the mobile terminal 122. Each mobile terminal may have the same configuration as the mobile terminal 122. In the present embodiment, the mobile terminal 122 includes a sending and receiving section 510, an emergency state determining section, a charge state determining section 530, a secondary battery 540, a communication control section 550, and an operation control section 560. The communication control section 550 includes an infrastructure communication module 552 and an ad hoc communication module 554.

The sending and receiving section 510 sends and receives data to and from the base station 102, the base station 104, the wireless LAN access point 106, or another mobile terminal. The sending and receiving section 510 may receive a parameter for controlling communication from the communication control section 550 and send and receive data according to this parameter. When the emergency disaster information is received from the disaster information distribution server 20, the sending and receiving section 510 may transmit this emergency disaster information to the emergency state determining section 520. When the emergency disaster information is received from the disaster information distribution server 20, the sending and receiving section 510 may provide the emergency state determining section 520 with a signal indicating that the emergency disaster information has been received.

The emergency state determining section 520 receives the emergency disaster information or a signal indicating that the emergency disaster information has been received from the sending and receiving section 510. The emergency state determining section 520 determines whether the mobile terminal 122 is to operate in the emergency operation mode. For example, the emergency state determining section 520 compares position information indicating the current position of the mobile terminal 122 to position information of the location where the disaster occurred included in the emergency disaster information, and determines that the mobile terminal 122 is to operate in the emergency operational mode if the distance between the current position of the mobile terminal 122 and the position where the disaster occurred is less than a predetermined value.

If the mobile terminal 122 has a plurality of emergency operational modes, the operation mode in which the mobile terminal 122 is to operate may be determined. For example, if the mobile terminal 122 has an infrastructure mode, an ad hoc mode, and an emergency ad hoc mode and is operating in the infrastructure mode during normal operation, the operation mode of the mobile terminal 122 is determined to be either the ad hoc mode or the emergency ad hoc mode.

If a connection cannot be established with at least one of the base station 102, the base station 104, and the wireless LAN access point 106 for a predetermined time, the emergency state determining section 520 may determine that the mobile terminal 122 is to operate in the emergency mode, e.g. the ad hoc mode. When it is determined that the mobile terminal 122 is not to operate in the emergency mode, the emergency state determining section 520 may determine that the mobile terminal 122 is to operate in the normal operational mode. The emergency state determining section 520 notifies the communication control section 550 and the operation control section 560 about the result of the determination by the emergency state determining section 520. If it is determined that the mobile terminal 122 is not to operate in the emergency operational mode, the emergency state determining section 520 need not notify the operation control section 560 about the determination result.

The charge state determining section 530 determines the charge state of the secondary battery 540. For example, if the secondary battery 540 is being charged or if the remaining charge amount of the secondary battery 540 is greater than a predetermined amount, the charge state determining section 530 notifies the communication control section 550 about this fact. If it is determined that the secondary battery 540 is not being charged, that the remaining charge of the secondary battery 540 is less than or equal to a predetermined amount, or that both of these situations are the case, the charge state determining section 530 notifies the communication control section 550 about this fact.

The communication control section 550 controls the communication of the mobile terminal 122. The communication control section 550 may determine the parameter for controlling communication. If a signal indicating that the mobile terminal 122 is to operate in the normal operational mode is received from the emergency state determining section 520 or if no signal indicating the determination result is received from the emergency state determining section 520, communication may be controlled using the infrastructure communication module 552, as described using FIGS. 1 and 2. As described using FIGS. 3 and 4, the infrastructure communication module 552 and the ad hoc communication module 554 may both be used to control the communication.

The infrastructure communication module 552 may determine the parameter for controlling the communication in the infrastructure mode. The infrastructure communication module 552 may be realized by executing the application program for realizing infrastructure communication function on the mobile terminal 122.

If a signal is received from the emergency state determining section 520 indicating that the mobile terminal 122 is to operate in the emergency mode, the communication control section 550 may control the communication using the ad hoc communication module 554. The ad hoc communication module 554 may determine the parameter for controlling the communication in the ad hoc mode. For example, the ad hoc communication module 554 may determine the number of links such that the number of links is less than or equal to the upper limit of the number of links set according to each operational mode.

The ad hoc communication module 554 may be realized by executing the program for realizing the ad hoc communication function on the mobile terminal 122. The communication control section 550 receives the signal indicating the charge state of the secondary battery 540 from the charge state determining section 530. If the secondary battery 540 is being charged or if the remaining charge of the secondary battery 540 is greater than the prescribed amount, the communication control section 550 may execute the program for realizing the ad hoc communication function. If the secondary battery 540 is not being charged, if the remaining charge of the secondary battery 540 is less than or equal to the prescribed amount, or if both of these situation are the case, the communication control section 550 may suspend or stop the execution of the program for realizing the ad hoc communication function.

The operation control section 560 receives the signal indicating the operational mode of the mobile terminal 122 from the emergency state determining section 520. If the mobile terminal 122 is to operate in the emergency operational mode, the operation control section 560 limits the processes that can be executed by the mobile terminal 122 according to the predetermined rules. For example, if the mobile terminal 122 is to operate in the ad hoc mode, the operation control section 560 limits the execution of programs that require a large amount of communication or consume a large amount of power.

In the above description, each component of the mobile terminal 122 may be realized by hardware or by software. Furthermore, the components of the mobile terminal 122 may be realized by a combination of software and hardware. For example, a computer may function as a portion of the mobile terminal 122 by executing a program on the mobile terminal 122. The program may be stored in a computer readable medium, or may be stored in a storage apparatus connected to a network. The mobile terminal 122 may be realized by activating software or a program that defines the operation of each component of the mobile terminal 122, using an information processing apparatus having a normal configuration including a data processing apparatus with a communication interface and the like, a CPU, a ROM, a RAM, a communication interface, and the like.

The programs that are installed on a computer and cause the computer to function as a portion of the mobile terminal 122 according to the present embodiment include modules that define the operation of each component of the mobile terminal 122. These programs and modules affect the CPU and the like to cause the computer to realize the function of each component of the mobile terminal 122. The information processes recorded in these programs are read by the computer and cause the computer to function as the specific means using software and the various hardware resources described above in cooperation. These specific means enable the realization of a unique communication system corresponding to an intended use, by realizing the computation and processing of information corresponding to the intended use of the computer according to the present embodiment.

The functions of each component of the mobile terminal 122 are not specifically distinguished, and the functions of each component of the mobile terminal 122 are not limited to the embodiment described above. For example, the emergency state determining section 520 may realize a portion of the functions of the operation control section 560, or the operation control section 560 may realize a portion of the functions of the emergency state determining section 520.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: communication network, 20: disaster information distribution server, 40: network management server, 100: communication system, 102: base station, 104: 1 network management server, 106: base station, 122: mobile terminal, 126: mobile terminal, 128: mobile terminal, 142: mobile terminal. 144: mobile terminal. 146: mobile terminal. 148: mobile terminal. 162: mobile terminal, 164: mobile terminal, 166: mobile terminal, 168: mobile terminal, 510: sending and receiving section, 520: emergency state determining section, 530: charge state determining section, 540: secondary battery, 550: communication control section, 552: infrastructure communication module, 554: ad hoc communication module, 560: operation control section

What is claimed is:

1. A communication system comprising:
a base station or wireless LAN access point; and
a plurality of mobile stations capable of establishing wireless communication with each other and forming an ad hoc network that realizes a mesh network topology, at least a first mobile station among the plurality of mobile stations operable to establish wireless communication with the base station or wireless LAN access point and connect a second mobile station among the plurality of mobile stations to the base station or wireless LAN access point using a tethering function, wherein
each of the plurality of mobile stations has a first ad hoc mode in which the number of links is limited to a first threshold value and a second ad hoc mode in which the number of links is limited to a second threshold value that is less than the first threshold value.

2. The communication system according to claim 1, wherein
at least a portion of the plurality of mobile stations execute an application program for realizing an ad hoc communication function when emergency disaster information is received.

3. The communication system according to claim 2, wherein
the application program limits processes that can be executed by the at least a portion of the plurality of mobile stations according to a predetermined rule.

4. The communication system according to claim 1, wherein
each of the plurality of mobile stations, when operating in the first ad hoc mode, switches to the second ad hoc mode upon receiving emergency disaster information.

5. The communication system according to claim 1, wherein
at least a portion of the plurality of mobile stations include an ad hoc communication function and, in response to operating in an ad hoc mode, execute a process to delete an image, audio, or video file upon receiving an electronic mail to which the image, audio, or video file is attached.

6. The communication system according to claim 1, further comprising:
a plurality of base stations; and
a network management server that controls or manages wireless communication between the plurality of base stations and the plurality of mobile stations, wherein
the network management server gives preferential treatment to a mobile station, among the plurality of mobile stations, that is operating in an ad hoc mode and that sends and receives data via a base station, among the plurality of base stations, that is near a base station, among the plurality of base stations, that experiences a communication failure or is expected to experience a communication failure.

7. The communication system according to claim 1, wherein each of the plurality of mobile stations realizes ad hoc communication in response to a secondary battery of the corresponding mobile station being charged or a remaining charge amount of a secondary battery of the corresponding mobile station being greater than a predetermined amount.

8. A mobile station comprising:
a sending and receiving section operable to send and receive data to and from a base station or wireless LAN access point and to and from another mobile terminal; and
a communication control section operable to (i) establish wireless communication with a second mobile station to form an ad hoc network that realizes a mesh network topology, the ad hoc network established in one of a first ad hoc mode in which the number of links is limited to a first threshold value and a second ad hoc mode in which the number of links is limited to a second threshold value that is less than the first threshold value, and (ii) connect the second mobile station to the base station or wireless LAN access point by establishing wireless communication with the base station or wireless LAN access point using a tethering function.

9. The mobile station according to claim 8, further comprising:
an emergency state determining section that determines whether the mobile station is to operate in an emergency operational mode, wherein
the communication control section executes an application program to realize an ad hoc communication function when the emergency state determining section determines that the mobile station is to operate in the emergency operational mode.

10. The mobile station according to claim 9, further comprising:
an operation control section that limits processes that can be executed by the mobile station according to a predetermined rule when the emergency state determining section determines that the mobile station is to operate in the emergency operational mode.

11. The mobile station according to claim 10, wherein, while the mobile station is operating in an ad hoc mode, the operation control section executes a process to delete an image, audio, or video file in response to receiving an electronic mail to which the image, audio, or video file is attached.

12. The mobile station according to claim 8, further comprising:
an emergency state determining section that determines whether the mobile station is to operate in an emergency operational mode, wherein
the emergency state determining section determines that the mobile station is to operate in the second ad hoc mode upon receiving emergency disaster information when the mobile station is operating in the first ad hoc mode.

13. The mobile station according to claim 8, wherein the communication control section realizes ad hoc communication in response to a secondary battery of the corresponding mobile station being charged or a remaining charge amount of a secondary battery of the corresponding mobile station being greater than a predetermined amount.

14. A non-transitory computer-readable medium storing thereon a program that causes a computer of a mobile station to perform operations comprising:
establishing wireless communication with a second mobile station to form an ad hoc network realizing a mesh network topology, the ad hoc network established in one of a first ad hoc mode in which the number of links is limited to a first threshold value and a second ad hoc mode in which the number of links is limited to a second threshold value that is less than the first threshold value; and
connecting the second mobile station to a base station or wireless LAN access point by establishing wireless communication with the base station or wireless LAN access point using a tethering function.

15. The non-transitory computer-readable medium according to claim 14, wherein the program causes the computer of the mobile station to perform operations further comprising:
determining whether the mobile station is to operate in an emergency operational mode; and
executing an application program to realize ad hoc communication when it is determined that the mobile station is to operate in the emergency operational mode.

16. The non-transitory computer-readable medium according to claim 15, wherein the program causes the computer of the mobile station to perform operations further comprising:
limiting processes that can be executed by the mobile station according to a predetermined rule when it is determined that the mobile station is to operate in the emergency operational mode.

17. The non-transitory computer-readable medium according to claim 16, wherein
the limiting includes executing a process to delete an image, audio, or video file in response to the mobile station being operating in an ad hoc mode and an electronic mail is received to which the image, audio, or video file is attached.

18. The non-transitory computer-readable medium according to claim 14, wherein the program causes the computer of the mobile station to perform operations further comprising:
determining whether the mobile station is to operate in an emergency operational mode, wherein
the determining includes determining that the mobile station is to operate in the second ad hoc mode upon receiving emergency disaster information when the mobile station is operating in the first ad hoc mode.

19. The non-transitory computer-readable medium according to claim 14, further comprising realizing an ad hoc communication function in response to a secondary battery of the corresponding mobile station being charged or a remaining charge amount of a secondary battery of the corresponding mobile station being greater than a predetermined amount.

* * * * *